United States Patent [19]

Pettit

[11] 4,095,836
[45] Jun. 20, 1978

[54] INFLATED LOAD BEARING CUSHION FOR CAMPER VEHICLES AND THE LIKE

[76] Inventor: John E. Pettit, 18219 46th Pl. S., Seattle, Wash. 98188

[21] Appl. No.: 661,787

[22] Filed: Feb. 26, 1976

Related U.S. Application Data

[63] Continuation-in-part of Ser. No. 516,783, Oct. 21, 1974, which is a continuation of Ser. No. 273,931, Jul. 21, 1972, abandoned.

[51] Int. Cl.$^2$ ............................................... B60P 3/32
[52] U.S. Cl. .................................. 296/23 MC; 49/477
[58] Field of Search ....................... 296/23 MC, 23 R; 49/477; 153/349

[56] References Cited

U.S. PATENT DOCUMENTS

| | | | |
|---|---|---|---|
| 2,244,481 | 6/1941 | Barder | 152/349 |
| 2,468,435 | 4/1949 | Epp | 296/97 D |
| 2,645,518 | 7/1953 | Cook | 296/23 R |
| 3,303,615 | 2/1967 | O'Neal | 296/23 MC |
| 3,586,119 | 6/1971 | Chuchua | 296/23 MC |
| 3,638,991 | 2/1972 | Hathaway | 296/23 MC |

Primary Examiner—Philip Goodman
Attorney, Agent, or Firm—James E. Nolan; John D. Nies; Philip E. Kurz

[57] ABSTRACT

To provide needed stability between a vehicle, such as a pick up truck, and an added removable body component, such as a camper, one or more large inflatable structural components are positioned fully between them at the cab location. For example, wherein a large camper is placed on a pick up truck and the camper has a cab-over portion generally housing a sleeping space, two inflatable structural components are utilized. One structural component is located fully on the cab roof and inflated into mutual contact with the cab-over portion of the camper that is directly opposite the full cab roof; the other structural component is located between the full rear of the cab, minus any window area, and the front wall of the camper, minus any window area, and is inflated into mutual contact with their respective surfaces. Each structural component functions to withstand and to modify the possible changing relative motions between the vehicle and body component so they become more of an overall single-like structural unit increasing the overall stability of their combination.

4 Claims, 11 Drawing Figures

U.S. Patent June 20, 1978 Sheet 1 of 3 4,095,836
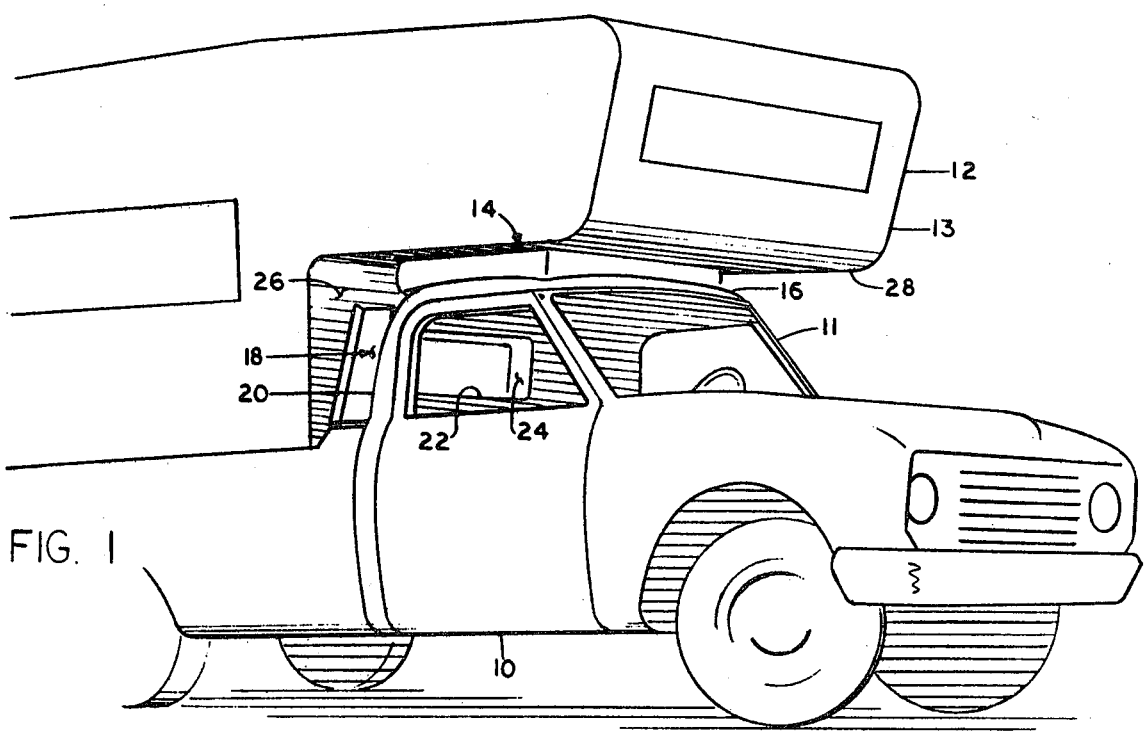
FIG. 1
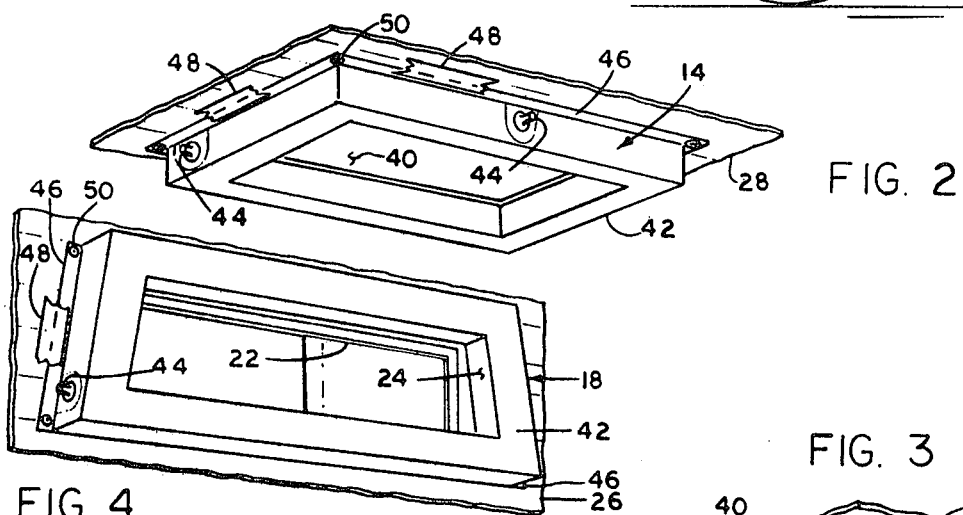
FIG. 2
FIG. 3
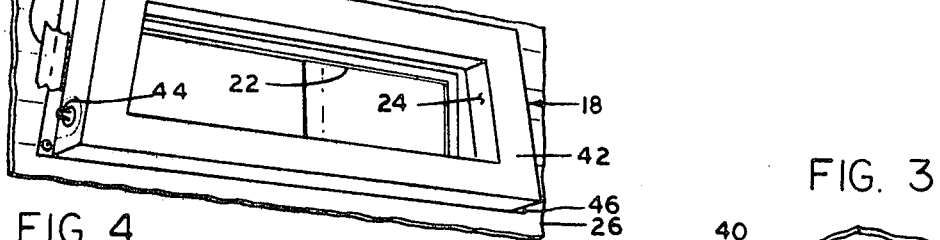
FIG. 4
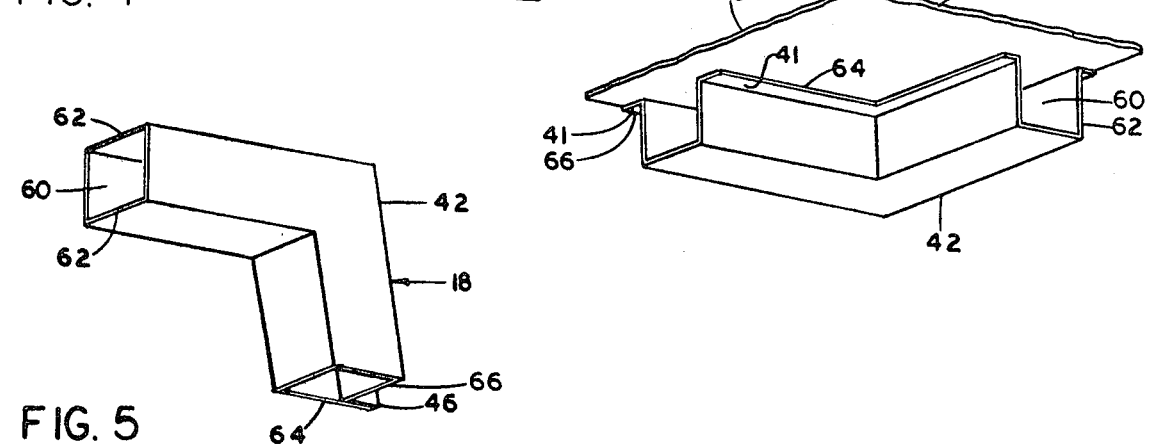
FIG. 5

INFLATED LOAD BEARING CUSHION FOR CAMPER VEHICLES AND THE LIKE

CROSS REFERENCES

This application is a continuation-in-part of application Ser. No. 516,783, filed Oct. 21, 1974, now pending, which in turn was a continuation of application Ser. No. 273,931, filed July 21, 1972, now abandoned.

BACKGROUND OF THE INVENTION

It is well known that it is desirable to provide as secure and as stable as possible, a vehicle and removable body component combination, such as a combined pick up truck and camper, to reduce dangerous opposing motions of the two as well as damages of one to the other which might otherwise occur as the combination is driven over roadways. Prior developments provided for bolting the body component to the vehicle and/or clamping or tieing it to a vehicle at various locations. In addition to being inconvenient, such securing procedures did not sufficiently reduce the sway, bounce and uplifting motions caused by road conditions and wind, which are undesirable for safe travel. Although mechanical hold downs between a camper and the pick up truck bed will continue to be relied upon, the positioning of one or two extensive inflated structural components at the cab location will complete the overall stabilization.

In respect to the prior art known today to the Applicant, attempts by others have been made at the cab location, to stabilize as an overall unit a pick up truck and camper, by utilizing vertical rods to connect the camper cabover portions to the front of the truck. However, there were no known attempts by others to undertake such stabilization as the Applicant does by utilizing extensive inflated structural components to transmit sizeable structural loads between the cab structures of pick up trucks and the oppositely spaced front structures of a camper.

SUMMARY OF INVENTION

Extensive inflated structural components function to reduce varient opposing forces which act upon the combination of a vehicle and removable body component, such as a camper-pickup truck combination driven along the roadways. These varient opposing forces originate, for example, from wind, uneven pavement, and sharp and/or rapid turns of the vehicle. Many times these varient opposing forces act in different degrees of intensity and angularity respectively on the pick up truck and the camper.

In order to modify these varient opposing forces so more equal effects will more likely occur to both the vehicle and the removable body, one or more inflatable structural components are positioned at one or more extensive locations between the cab of a pick up truck and the front of the camper, and thereafter inflated until they are in mutual contact with substantially all of the opposing structure of the cab of the pick up truck and the directly opposite structure of the camper. This installation of the inflated structural component results in providing a shock absorbing and load transfer buffer structural member, which acts to withstand and to modify the otherwise often unsafe conflicting forces. The utilization of these inflated structural components prevents otherwise pontential damage to the vehicle and/or removable body component by insuring the pick up truck and camper become, as an assembly, more of a single structural unit, as each unit of the combination then reacts in a more stable manner to travel created disturbing forces.

Variations of the inflated structural components include one embodiment which is placed so any visual and hearing passageways between the cab of the pick up truck and camper remain accessible, and another embodiment which is placed between the cab roof and cab-over portion of the camper. All embodiments are first positioned and then inflated to conform to any configuration of the space between the full surface structures of the cab of the pickup truck and the oppositely spaced surface structures of the camper. Suction cups and cross ties are preferably used to maintain the position of these inflated structural components.

DRAWINGS OF PREFERRED EMBODIMENTS

FIG. 1 is a partial perspective view of a combined pick up truck and camper with inflated structural components installed to transit structural loads;

FIG. 2 is an underside perspective view of one embodiment of an inflated structural component which is placed between essentially the entire roof of the cab of the pick up truck and the bottom of the cab-over portion of the camper, indicating in part a portion of the camper;

FIG. 3 is a partial cross-section underside perspective view, with portions removed, of an inside corner of the inflated structural component shown in FIG. 2;

FIG. 4 is a front perspective view of the inflated structural component which is placed between the front of the camper and essentially the entire rear wall of the cab of the pick up truck, indicating in part a portion of the camper;

FIG. 5 is a partial cross-section front perspective view, with portions removed, of the inside corner of the inflated structural component shown in FIG. 4;

Figure 9:
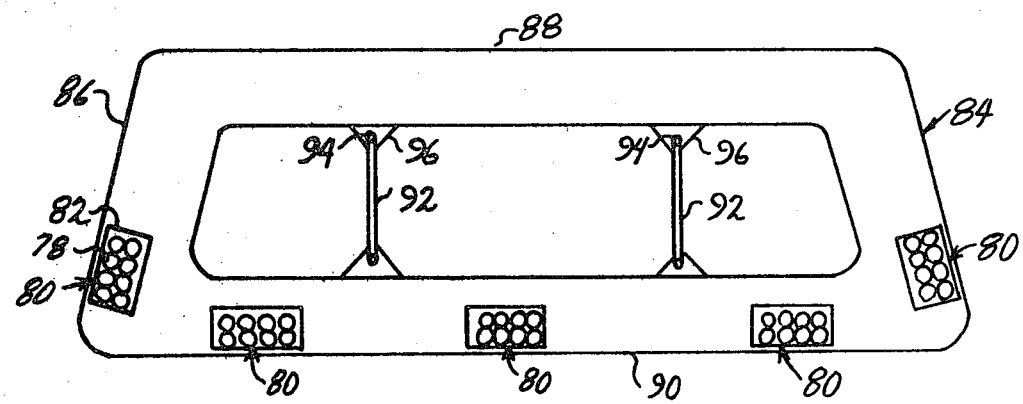
Figure 8:
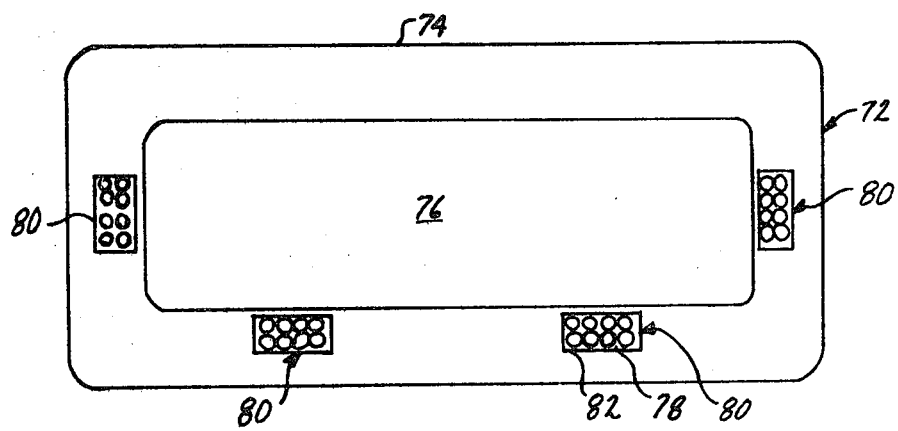
Figure 10:
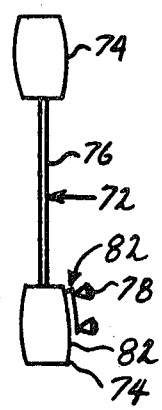
Figure 11:
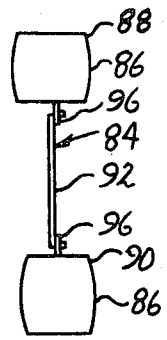

FIG. 8 is a bottom view of a fifth embodiment of an extensive inflated structural component for sealing and stabilizing placement between essentially the entire roof of the cab of a pick up truck and the bottom of a cab-over portion of a camper, illustrating its somewhat overall rectangular tube, which is centrally closed along its mid tube section by a complete web portion covering the central area it defines, and which has four groups of suction cups along its bottom side, two of these groups being on the bottom surface of the front portion of the rectangular tube, and two of these groups being on the bottom surface opposite one another along the respective left and right portions of the overall rectangular tube;

FIG. 9 is a rear view of a sixth embodiment of an extensive inflated structural component for sealing and stabilizing placement between essentially the entire rear of a cab of a pick up truck and the front of a camper, illustrating its somewhat overall rectangular tube, which is left open in the central area it defines to clear both the camper windows and cab windows, which becomes gradually wider from its bottom to its top to fit the space between the slanted forward cab back and upright camper, which has top to bottom cross ties and their tie downs, located to the left and right of center in the central clear area, and which has five groups of suction cups along the overall vertical sides, two of these groups being on respective side portions of the vertical sides and three of these groups being along the bottom portion of the vertical sides;

FIG. 10 is a transverse cross section of the fifth embodiment, shown in FIG. 8, taken to the right of center to indicate the shape of inflated structural component resulting in the perimeter tubes, the central continuous web, and the suction cup group; and FIG. 11 is a transverse cross section of the sixth embodiment, shown in FIG. 9, taken immediately adjacent to a cross tie and near the midpoints of its respective tie downs.

DESCRIPTION OF PREFERRED EMBODIMENTS

The truck/camper combination illustrated in FIG. 1 shows a pick up truck 10 with camper 12 mounted thereon. One inflated structural component 14, the top one, is positioned between the roof 16 of the truck cab 11 and the bottom 28 of the cab-over portion 13 of the camper. A second inflated apertured structural component 18 the rear one is positioned between the front wall 26 of the camper 12 and the rear wall 20 of the cab 11. The second structural component 18 i.e. the rear one, has an aperture 24 approximating the size of the window openings passageway 22 between the camper 12 and cab 11.

The top inflated structural component 14, illustrated in FIG. 2, shows a mat, web, or planar portion 40 with an air-filled tube 42 around its parameter. Air valves 44 allow inflation of this structural component. A fastening flange 46 of structural component 14 is secured to the bottom 28 of the camper by an adhesive material such as tape 48. Or this top structural component 14 is tied in place using rope, not shown, and metal grommets 50. Or as indicated in other embodiments suction cups are used.

The cutaway view in FIG. 3 of a top structural component 14 shows the air-filled tube portion 42 with an air chamber 60 and air chamber walls 62, which are formed using a thin flexible material such as rubber or vinyl. Preferably a white 22 gauge polyvinylchloride, often referred to as PVC, is used and it is specially formulated to meet nearly all weather conditions. The chamber 60 pressure tests to at least ten pounds per square inch. During actual use it is inflated to ¾ of pound. The mat or web 40 and fastening flange or ridge 41 are likewise made of similar flexible materials. However in this embodiment, they are of somewhat greater thickness than the air chamber walls. The tube portion 42 is permanently sealed to the mat 40 around the inner perimeter 64 and the outer perimeter 66.

The rear inflated structural component 18, illustrated in FIG. 4, shows an aperture 24 accommodating a window opening or passageway 22 located at the front wall of a camper 26 and a rear window of the cab 11. Valve 44 allow inflation of the tube portion 42. A fastening flange 46 is secured to the front wall of camper 26 by adhesive material such as tape 48 or by use of ties, not shown, and metal grommets 50, or suction cups.

A cutaway of the rear inflated structural member 18, illustrated in FIG. 5, shows the air-filled tubular portion 42 having air chamber 60 and air chamber walls 62, which are made of thin flexible material such as rubber, vinyl or specifically 22 gauge polyvinylchloride. The air chamber 60 is pressure tested to at least 10 pounds per square inch and during actual use it is inflated to ¾ of a pound. A fastening flange 46 is formed upon sealing the back wall 64 to the side wall 66 of the air-filled tubular portion 42.

Figure 6:
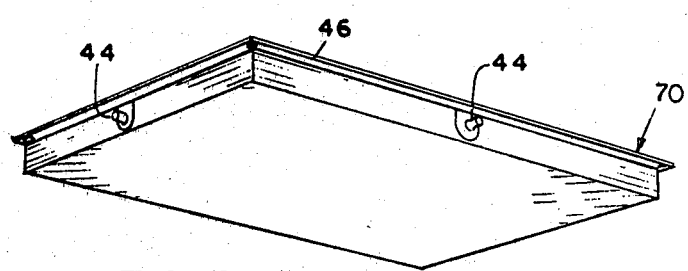
FIG. 6 is an underside perspective view of a third embodiment of an inflated structural component for selective placement between camper and cab of a pick up truck.

A third embodiment of this invention is shown in FIG. 6. An air-filled structural component 70 for top or rear placement between a camper and a truck body has valves 44 for inflation, and also a fastening flange 46 for securing the component 70 to a camper or truck. The inflated structural component 70 is constructed of a like thin flexible material. Its chamber is pressure tested to at least 10 pounds per square inch and in actual use, it is inflated to ¾ of a pound.

Figure 7:
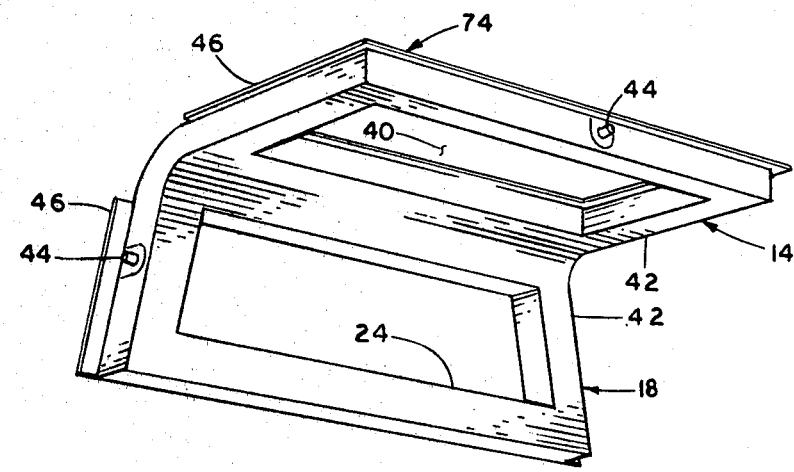
FIG. 7 is an underside perspective view of a fourth embodiment of an extensive extended inflated structural component for simultaneous placement between the front of the camper and substantially the entire rear of the cab of a pick up truck, and between essentially the entire roof of the cab of a pick up truck and the bottom of the cab-over portion of the camper.

A fourth embodiment of this invention is a single larger inflated dual structural member 74, illustrated in FIG. 7. It is simultaneously positioned between the front of the camper 12 and the back of the truck cab 11 and the cab-over portion of the camper 12 and the roof of the cab 11. An air-filled structural portion 18 is placed between the front of the camper 12 and the back of the truck 10. It has a window opening or passageway aperture 24 through the air-filled tubular portion 42, and a fastening flange 46 for securement to a camper. The other air-filled structural portion 14 is placed between the cab-over portion of the camper and the roof of the cab. Its air-filled tubular portion 42 is sealed to the perimeter of the mat or web 40, and the fastening flange 46 is secured to the bottom wall of the cab-over portion of the camper 12. Inflation is achieved through valves 44.

The fifth embodiment, illustrated in FIG. 8, is of an extensive inflated structural component 72 for sealing and stabilizing placement between essentially the entire roof 16 of the cab 11 of a pick up truck 10 and the bottom 28 of the cab-over portion 13 of a camper 12. It has a somewhat overall rectangular tube 74 which is centrally closed along its mid tube section by a complete web portion 76 covering the central area determined by the rectangular tube 74. For its removable but secure attachment, optionally to the smoothest surface, of either the cab 11 or camper 12, suction cups 78 are provided. Preferably, there are four groups of suction cups with eight of them to a group 80. They are first arranged on their own common backing strip 82 which in turn is secured to the rectangular tube 74. Two groups 80 are spaced apart along what becomes the front bottom surface upon the installation of this extensive inflated structural component 72. The other two groups 80 are respectively located on the right and left bottom surfaces. Using this arrangement of the suction or vacuum cup groups 80, in conjunction with the web portion 76, the overall rectangular tube 74 is maintained in its position over the main reenforcements of the roof 16 of the cab 11. In such position it transits the static and dynamic structural loadings and creates the wind seal, while leaving the central area of the unreinforced cab top free to flex, without impairing the overall important function of the inflated structural component 72.

The sixth embodiment, illustrated in FIG. 9, is of an extensive inflated structural component 84 for sealing and static and dynamic load transferring and modifying stabilizing function placement between essentially the entire rear wall 20 of a cab 11 of a pick up truck 10 and the front wall 26 of a camper 12. It has a somewhat overall rectangular tube 86, having a top transverse portion 88 which is generally shorter than its bottom transverse portion 90. For its removable but secure attachment, optionally to the smoothest surface, of either the cab 11 or camper 12, suction cups 78 are provided. Preferably, there are five groups 80 of suction cups 78 with eight of them to a group 80. They are first arranged on their own common backing strip 82, which in turn is secured to the rectangular tube 86. Three groups 80 are spaced apart along what becomes the bottom front or back surface, depending on whether they optionally contact the cab 11 or camper 12, upon the installation of this extensive inflated structural component 84. The other two groups 80 are respectively located on the right and left front or back surfaces. The central area determined by the overall rectangular tube 86 is left clear to keep the passageway 22 open between respective window openings of the cab 11 and camper 12, while weather sealing about them, during its dynamic and static load transferring and modifying stabilizing function. Most cabs 11 have a rear wall 20 which slopes forward from its bottom to top. Generally, therefore, the top transverse portion 88 is made progressively thicker in its air volume to compensate for this sloping rear wall 20 of the cab, which leaves a larger space to fill between it and the front wall 26 of the camper 12. To insure the continuing correct placement of the top transverse portion 88 of the rectangular tube 86, dual cross ties 92 are spaced apart on either side of the centerline and secured through eyelets 94 at tie downs 96, secured in turn to the rectangular tube 86. These cross ties 92 serving in conjunction with the suction or vacuum cups 78 insure the continuing correct placement of the top transverse portion 88, and consequently, the correct placement of the entire extensive inflated structural component 84.

FIG. 10 illustrates the transverse crosssection of the fifth embodiment, shown in FIG. 8, as the extensive inflated structural component 72 appears just to the right of its center. The cross-section of its overall rectangular tube 74, the central continuous web 76, and the suction or vacuum cup group 80 are shown in their inflated positions.

FIG. 11 illustrates the transverse cross-section of the sixth embodiment, shown in FIG. 9, as the extensive inflated structural component 84 appears immediately adjacent to a cross tie 92 and near the midpoints of the respective tie downs 96. The cross-section of its overall rectangular tube 86, the tie downs 96, and the cross tie 92 are shown in their inflated positions. Generally at this cross-section, there are no suction cup groups 80, as noted in FIG. 9, however, optionally there could be some suction cups 78 located at this cross-section on another embodiment.

SUMMARY OF ADVANTAGES

The inflatable, structural components in their various embodiments provide added stability, and safety, by creating a unitizing effect through the transfer and modification of static and dynamic loads to a vehicle and removable body component combination, such as a camper-truck combination as it travels over roadways. Thereby placement of one or more of these inflated structural components in mutual contact with and between the camper unit and the cab of the truck reduces bounce, sway, propoising, and uplift motions. Also in cab-over type campers which have an inflatable structural component installed between the cab-over portion and the cab roof, more even weight distribution is achieved by thereby adjusting a selected portion of the camper weight on the front wheels of the vehicle. As erratic relative movements of the camper on the truck are reduced, damage, otherwise caused by adverse relative movements of the camper and the truck each other, is generally avoided. Moreover, with one or more inflatable structural components installed wind and bugs are deflected and the beneficial wind deflection is believed to aid the driver in his steering of the truck.

The inflatable structural components because of their initial sizing, flexibility, and inflatability, conform to the configurations of the surface areas present between the camper and cab of the truck. Placement of each inflatable structural component is easily undertaken as it is located before inflation. When each inflatable structural component is not in use, it may be deflated, compacted, and stored conveniently awaiting its next important use period when the camper is remounted on the pick up truck.

I claim:

1. For use with a vehicle having a cab and a removable component such as a camper, the cab and camper having at least a pair of adjacent, spaced apart surface areas, a load bearing cushion insertable between said surface areas, said cushion being constructed of airtight flexible material and having top, bottom and side walls forming an airtight, expansible, inflatable chamber, said side walls being so dimensioned that, upon insertion between the cab and camper spaced apart surface areas and inflation, said cushion will fit tightly between the surface areas to stabilize the vehicle and removable component, at least one of said top and bottom walls of said cushion being provided with suction cup means thereon and over a substantial portion of said one wall to firmly engage with one of said surface areas upon inflation of said cushion whereby said cushion is retained between the surface areas regardless of even substantial relative articulating movement between the spaced surface areas are caused by road travel of the vehicle - removable component combination, wherein said chamber is in the form of a generally rectangularly configured torus of four sections, said suction cup means being arranged in clusters and effectively anchoring about half the surface area of said one wall and wherein at least one of said four sections of said cushion defines by said rectangularly configured torus is free of said suction cup means clusters so as to function as a rain and debris barrier upon insertion and inflation of said cushion in the vehicle-removable component combination.

2. The load bearing cushion claimed in claim 1 wherein cross tie means are provided, extending across the space defined by the torus.

3. The load bearing cushion claimed in claim 1 wherein each of said suction cup means clusters comprises eight suction cups arranged in parallel rows of four cups each whereby upon inflation of said cushion at least half of the cups of said each suction cup cluster will engage the surface area against which they are placed, regardless of irregularities in the structure of the surface area.

4. The load bearing cushion claimed in claim 1 further comprising, in combination, an additional cushion similarly configured and adapted to be inserted between an additional pair of generally parallel, spaced apart surface areas in the vehicle - removable component combination.

* * * * *